W. J. Miller,
Making Cut Nails,
N° 11,172.    Patented June 27, 1854.
Fig. 1.
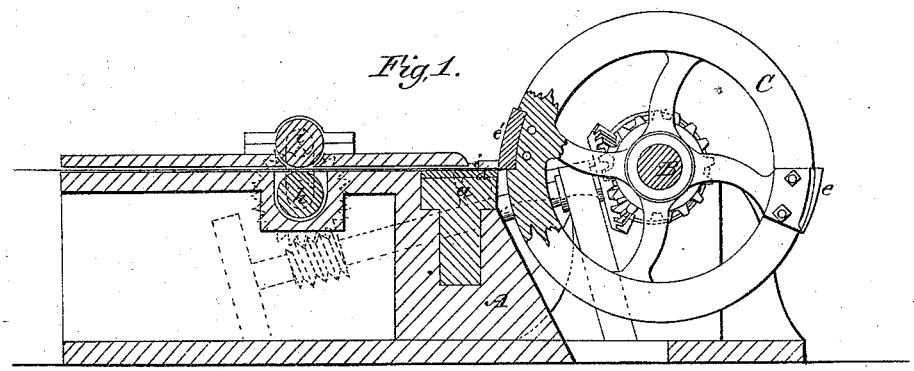
Fig. 2.
Fig. 3.
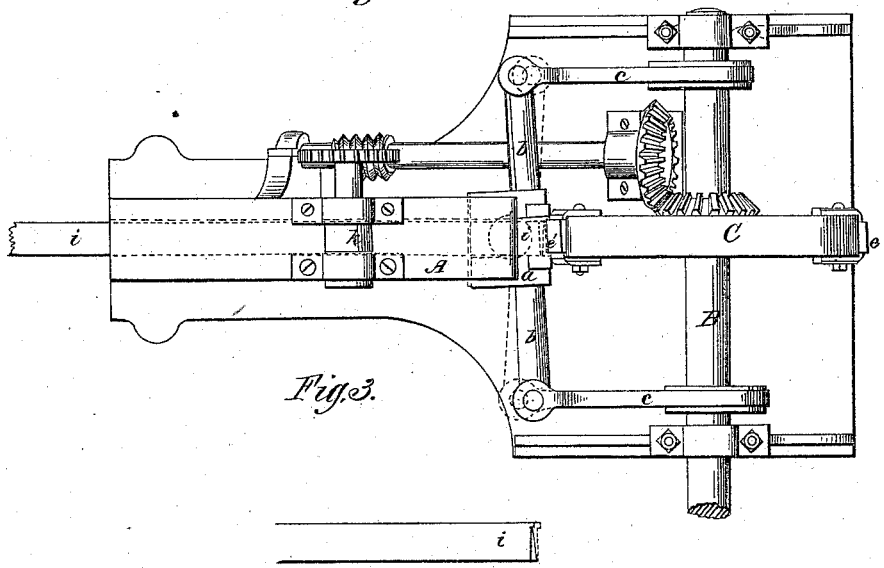

UNITED STATES PATENT OFFICE.

WILLIAM J. MILLER, OF COLD SPRING, NEW YORK.

MACHINE FOR CUTTING BRADS.

Specification of Letters Patent No. 11,172, dated June 27, 1854.

*To all whom it may concern:*

Be it known that I, WILLIAM J. MILLER, of Cold Spring, county of Putnam, and State of New York, have invented certain new and useful Improvements in Machines for Cutting Brads, &c.; and I do hereby declare that the following is a full, clear, and exact description of the same, reference being made to the annexed drawings, making a part of this specification, in which—

Figure I is an elevation partly in section. Fig. II is a top view or plan. Fig. III is a view of the manner in which the iron is cut, and similar letters refer to similar parts throughout.

My invention is for certain improvements in machinery for cutting brads, lath nails and others of similar character. Such brads and nails are cut from a sheet or ribbon of metal of a width suitable for making the length of one brad and the head of another. The dies for cutting must be of such shape as to give the proper taper and in order therefore to maintain a fair edge during the cutting up of the strip the heads are formed alternately on each side as seen in Fig. III.

In some of the old machines this is accomplished by turning over the strip of metal after every cut, the cutter on the anvil being fixed; while another method has been to employ two reciprocating cutters on the anvil, one of which is brought into action at each alternate cut. In my improvement, however, the lower part of the shear is a single cutter vibrating on an axis, whereby it is made to take the required position. Thus all the time required for turning the plate is saved, while the greater stability and accuracy of operation of the cutting anvil, due to that method is retained.

My machine is constructed and operated as follows:

At A is a strong anvil or base-block, cast upon or otherwise properly secured to the bed-plate. In its top a cavity is made to receive a center pin and fixture on which the vibrating part of the shear is secured. To hold and operate this vibrating part, there is a plate (*a*) having a pin or axis fitted to the recess in the base-block A as shown; from its sides two arms (*b*) branch out horizontally crosswise of the machine, as seen in Fig. II; from the ends of these, connecting rods (*c*) extend to the main shaft, where they terminate in eccentrics on said shaft as represented, the set of the eccentrics being such as to have their throw or greatest elongation on opposite sides of the shaft. This gives the vibratory motion to the shear plate. The vibrating part of the shear is a piece of steel (*d*) faced upon the plate (*a*) and having its cutting edge, which is straight, slightly overhanging toward the rim of the wheel, as shown in the Fig. I.

At B is the main shaft supporting a heavy wheel placed so that its face will be directed toward and be near to the edge of the vibrating part of the shear, the axis of the main shaft being on a level with the face of said shear. The face at points on opposite sides is cut away and fitted to receive two pieces of steel, each forming alternately the revolving part of the shears, and as shown at (*e*) and (*e'*). The edge of each of these revolving parts is shaped so as to stand at an angle with the face of the wheel in order to cut the brad with the proper taper, and, as the heads are formed alternately from side to side so these angles are set in opposite directions, as shown at (*e*) and (*e'*) Fig. II. The use of the vibrating part (*d*) of the shear will now be apparent, for in order to make a clean cut the two edges of the shears, viz, the vibrating and the revolving, at the moment of operating on the metal must face or be parallel with each other, and so near as just to give to one of them passage by the other. As therefore the edge of the revolving shear (*e'*) approaches the sheet of metal represented at (*i*) the edge of the vibrating part (*d*) of the shear will be adjusted to lie parallel by the movement of the arms (*b*) operated by the eccentrics on the main shaft as clearly represented and the brad is properly cut off, one edge of the shear coming down on the strip a little inside of its edge whereby the head is formed as shown by the dotted lines and also as represented in Fig. III. The second rotating shear (*e*) now approaches having its edge set at an angle in the opposite direction. The edge of the vibrating shear must now be turned so as to lie parallel with the revolving shear, which is approaching, as in the former case. The arms (*b*) accordingly move to the position shown in the dotted lines Fig. II, the throw of the eccentrics being set properly to effect it, and the opposite edge of (*e*) being also so set as to cut within the edge of the strip in order to leave the projection for the head of the brad next to be cut as before. The strip (*i*) of metal is fed along in a channel in a table as shown, the onward motion being effected by two feed rollers (*k*) operated by suitable gearing and driven from the main shaft in order that the velocities of the two shall always bear the given relation to each other demanded by the quantity to be fed, which must always be the same during the passage of one revolving shear to the other.

In making brads or nails of other shapes or sizes the cutting shears must be changed and others of the required form substituted. In the case of length the channel on the table for guiding the strips must be widened. This is accomplished by setting apart the guide pieces by set screws or by any other convenient device.

What I claim as of my invention, and desire to secure by Letters Patent, is—

The arrangement of the vibrating shear in relation to the revolving shears or cutters as connected, so as to change the position of the cutting edge of the vibrating cutter and cause it always to stand parallel with the edge of each revolving cutter until the nail has been cut off, substantially in the manner set forth.

WILLIAM J. MILLER.

Witnesses:
S. H. MAYNARD,
JAMES L. ROBERTS.